United States Patent
Low et al.

(10) Patent No.: US 9,398,159 B1
(45) Date of Patent: *Jul. 19, 2016

(54) GATHERING INFORMATION FOR MEMBERS OF CALL

(71) Applicant: International Business Machines Corporation, Armonk, NY (US)

(72) Inventors: Andrew R. Low, Stittsville (CA); Travis R. Winter, Nepean (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/593,302

(22) Filed: Jan. 9, 2015

(51) Int. Cl.
*H04W 4/00* (2009.01)
*H04M 3/56* (2006.01)
*H04M 7/00* (2006.01)
*H04M 7/12* (2006.01)
*H04W 4/08* (2009.01)
*H04W 84/04* (2009.01)

(52) U.S. Cl.
CPC .............. *H04M 3/56* (2013.01); *H04M 7/006* (2013.01); *H04M 7/1205* (2013.01); *H04W 4/08* (2013.01); *H04W 84/042* (2013.01)

(58) Field of Classification Search
None
See application file for complete search history.

(56) References Cited

U.S. PATENT DOCUMENTS

| | | | | |
|---|---|---|---|---|
| 6,499,021 B1 * | 12/2002 | Abu-Hakima | ......... | G06Q 10/10 706/10 |
| 6,653,236 B2 * | 11/2003 | Wai | ......... | C23C 18/48 257/E21.17 |
| 7,010,288 B2 * | 3/2006 | Brown | ......... | H04M 1/642 455/412.1 |
| 7,930,267 B2 | 4/2011 | Samn | | |
| 8,139,737 B2 | 3/2012 | Chang et al. | | |
| 8,204,759 B2 | 6/2012 | Ashour et al. | | |
| 8,391,445 B2 | 3/2013 | Hoblit et al. | | |
| 8,548,143 B2 | 10/2013 | Vendrow | | |
| 2003/0041048 A1 * | 2/2003 | Balasuriya | ............ | H04M 3/436 |
| 2003/0083047 A1 * | 5/2003 | Phillips | ............... | H04L 12/5895 455/412.1 |
| 2004/0039731 A1 * | 2/2004 | Levy | ............... | G06F 17/241 |

(Continued)

FOREIGN PATENT DOCUMENTS

WO 2013028325 A2 2/2013

OTHER PUBLICATIONS

List of IBM Patents or Patent Applications Treated as Related, 2 pg.
Low et al., "Gathering Information for Members of Call", U.S. Appl. No. 14/921,154, filed Oct. 23, 2015, 34 pages.
"Using Enterprise Server to Identify Callers with Voice-ID," [online] IP.Com Prior Art Database, Disclosure No. IPCOM000160769D, Nov. 28, 2007, retrieved from the Internet: <http://ip.com/IPCOM/000160769>, 1 pg.

(Continued)

*Primary Examiner* — Diane Mizrahi
(74) *Attorney, Agent, or Firm* — Cuenot, Forsythe & Kim, LLC

(57) ABSTRACT

Responsive to detecting a call from a first user into a call system, a user identifier associated with the first user to can be added to respective user information stored in an e-meeting data structure associated with the call. A determination can be made as to whether the call system recognizes the user identifier associated with the first user and, responsive to determining the call system does not recognize the user identifier associated with the first user, a determination can be made as to whether the call system recognizes a voice of the first user. If the call system does not recognize the voice of the first user, a location of the first user can be identified by processing the user identifier. The location of the first user can be added to respective user information stored in the e-meeting data structure. An e-meeting can be generated for the call.

14 Claims, 5 Drawing Sheets

(56) References Cited

U.S. PATENT DOCUMENTS

| | | | | |
|---|---|---|---|---|
| 2004/0064351 | A1* | 4/2004 | Mikurak | G06Q 10/087 705/22 |
| 2005/0276397 | A1* | 12/2005 | Hiatt | H04M 3/42161 379/90.01 |
| 2009/0311999 | A1* | 12/2009 | Sarkar | H04M 3/02 455/415 |
| 2012/0196581 | A1 | 8/2012 | Papakipos et al. | |

OTHER PUBLICATIONS

"System and Method for Retrieving and Displaying the Caller Information in Mobile Phone," [online] IP.Com Prior Art Database, DisclosureNo. IPCOM000218265, May 31, 2012, retrieved from the Internet:<http:ip.com/IPCOM/000218265>, 1 pg.

"Team Analytics," [online] IBM Corporation, [retrieved Jan. 8, 2015] confidential information redacted, retrieved from the IBM Intranet: <w4.ibm.com/teamanalytics/ta.pl>, 1 pg.

* cited by examiner

GATHERING INFORMATION FOR MEMBERS OF CALL

BACKGROUND

Arrangements described herein relate to communication services.

People communicate with one another using a variety of different communication mediums. One example of such a communication medium is a traditional telephone system, which uses the public switched telephone network (PSTN) to support voice communication using telephones. Mobile communication networks, for example cellular communication networks, also support voice communication using mobile telephones (e.g., smart phones, tablet computers, cellular telephones, personal digital assistants, etc.). Many mobile communication networks also support multimedia communication among users using smart phones, tablet computers, and the like. The Internet also supports voice and multimedia communications, for example among telephones configured to communicate using voice over IP (VoIP).

A person can initiate a communication session with another person by placing a call to the other person, which typically is the method used when only two people are participating in a call. When more than two people are participating in the communication session, for example in a conference call, there are different ways in which the communication session can be established. For example, some phones support teleconferencing, though usually among no more than a few participants. Also, teleconferencing systems are commonly used to host conference calls, and oftentimes allow for a large number of people to participate in a single conference call. When a teleconferencing system is used, rather than dialing each other, participants usually call into the teleconferencing system itself.

SUMMARY

A system includes a processor programmed to initiate executable operations. The executable operations include, responsive to detecting a call from a first user into a call system, adding a user identifier associated with the first user to respective user information stored in an e-meeting data structure associated with the call. The executable operations also include determining whether the call system recognizes the user identifier associated with the first user and, responsive to determining the call system does not recognize the user identifier associated with the first user, determining whether the call system recognizes a voice of the first user. The executable operations further include, responsive to determining the call system does not recognize the voice of the first user, identifying, based on the user identifier associated with the first user, a location of the first user and adding the location of the first user to respective user information stored in the e-meeting data structure associated with the call. The executable operations also include generating an e-meeting for the call, the e-meeting including as participants the first user and at least a second user.

A computer program includes a computer readable storage medium having program code stored thereon. The program code is executable by a processor to perform a method. The method includes, responsive to detecting a call from a first user into a call system, adding, by the processor, a user identifier associated with the first user to respective user information stored in an e-meeting data structure associated with the call. The method also includes determining, by the processor, whether the call system recognizes the user identifier associated with the first user and, responsive to determining the call system does not recognize the user identifier associated with the first user, determining, by the processor, whether the call system recognizes a voice of the first user. The method further includes, responsive to determining the call system does not recognize the voice of the first user, identifying, by the processor processing the user identifier associated with the first user, a location of the first user and adding the location of the first user to respective user information stored in the e-meeting data structure associated with the call. The method also includes generating, by the processor, an e-meeting for the call, the e-meeting including as participants the first user and at least a second user.

DETAILED DESCRIPTION

Figure 1:
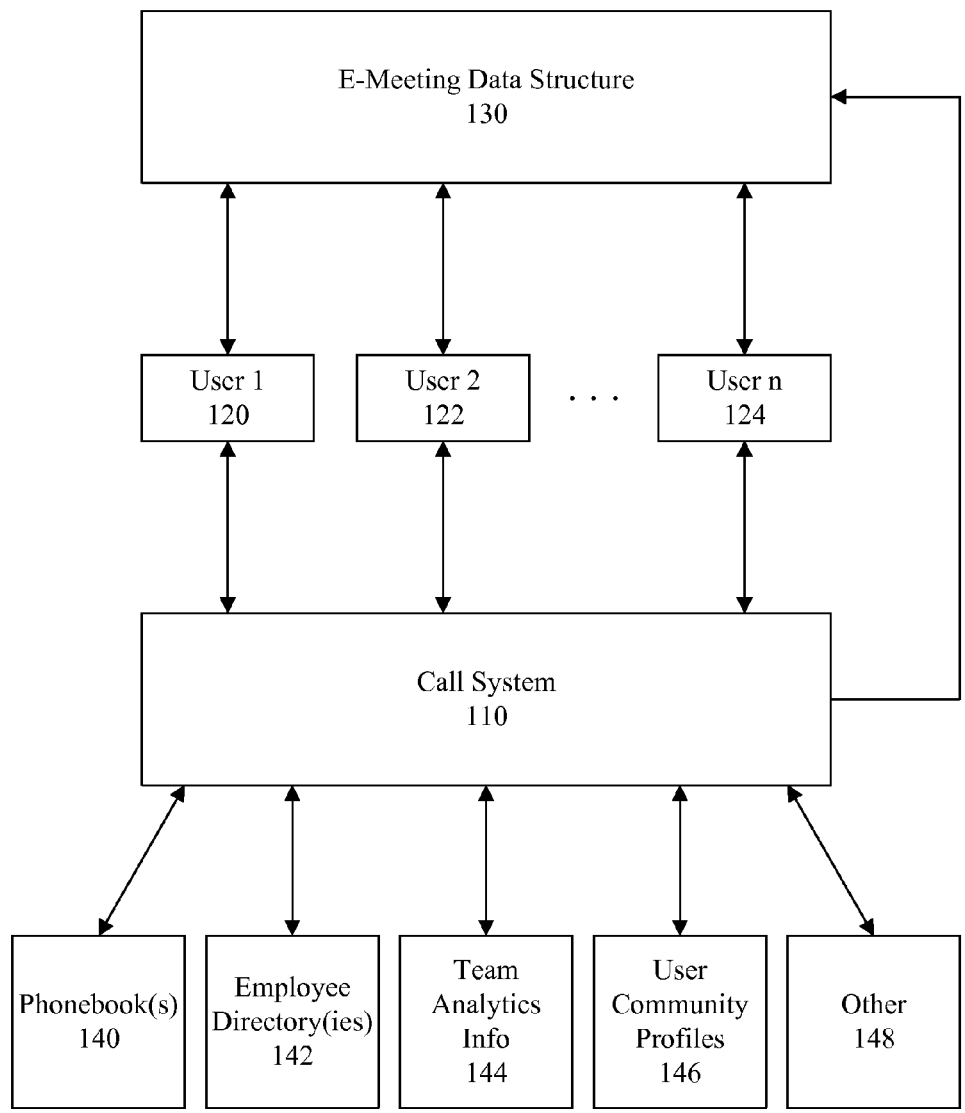
FIG. 1 is a block diagram illustrating an example of a communication system.

While the disclosure concludes with claims defining novel features, it is believed that the various features described herein will be better understood from a consideration of the description in conjunction with the drawings. The process (es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

The present arrangements relate to communication services and, more particularly, to providing identification data associated with users participating in a call. Several definitions that apply throughout this document now will be presented.

As defined herein, the term "call" means a telephone call, a video call or a multimedia call placed by a user.

As defined herein, the term "line" means a communication link supporting a call.

As defined herein, the term "call system" means a system configured to implement call handing operations.

As defined herein, the term "e-meeting" means an electronic meeting in which users participate in the electronic meeting via a call.

As defined herein, the term "e-meeting data structure" means a functional data structure stored to a computer readable storage medium.

As defined herein, the term "dashboard" means a viewable component, presented on a display, which presents at least one user profile.

As defined herein, the term "profile" means information related to a particular user who is participating in an e-meeting. The information can be gathered from a variety of information sources.

As defined herein, the term "responsive to" means responding or reacting readily to an action or event. Thus, if a second action is performed "responsive to" a first action, there is a causal relationship between an occurrence of the first action and an occurrence of the second action, and the term "responsive to" indicates such causal relationship.

As defined herein, the term "computer readable storage medium" means a storage medium that contains or stores program code for use by or in connection with an instruction execution system, apparatus, or device. As defined herein, a "computer readable storage medium" is not a transitory, propagating signal per se.

As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "user" means a person (i.e., a human being).

FIG. 1 is a block diagram illustrating an example of a communication system 100. The communication system 100 can include a call system 110 that facilitates management of e-meetings. The call system 110 can be configured to route incoming calls for e-meetings to the appropriate users, as well as host conference calls for e-meetings. Users can participate in the e-meetings using any of a variety of communication devices, for example telephones, smart phones, tablet computers, personal computers, video conferencing systems, and the like.

In illustration, a user 120 can place a call to a user 122. The call system 110 can detect the incoming call and route the call to the user 122 and create an e-meeting for the call. In an example in which the call system 110 hosts a conference call, users 120, 122, 124 can place calls to the call system 110, and the call system 110 can route the calls to the conference call. Further, the call system 110 can create an e-meeting for the conference call. In one aspect, users 120-124 who wish to participate in the conference call can be prompted to enter a conference identifier, security code, and/or the like. Responsive to the users providing the requested information, the users 120-124 can be connected to the conference call. The calls placed by the users 120-124 can be telephone calls, audio/video calls or multimedia calls. In a multimedia call, not only can users communicate audio/video information, but users also can communicate other types of information, for example presentations, documents, files, and the like.

For a particular e-meeting, which may be established as a direct call between users 120, 122 or a conference call, the call system 110 can generate an e-meeting data structure 130 for the e-meeting. For example, the call system 110 can create an e-meeting identifier, create one or more records in a data table or the like, and populate the e-meeting identifier into one or more fields of the record(s). In another arrangement, the call system 100 can create a table or file configured to maintain data for the e-meeting.

In the e-meeting data structure 130, the call system 110 can store information associated with each of the users 120-124 who place a call detected by the call system 110. For example, the call system 110 can identify a user identifier, a caller ID and/or a telephone number indicated by each incoming call, and store that information to the e-meeting data structure 130. In another example, responsive to detecting spoken utterances of a user in an e-meeting, the call system 110 can perform voice identification on the spoken utterances to identify the user. In illustration, the call system 110 can compare characteristics of the detected spoken utterances to voice prints and, if a match is found, identify the user based on the matching voice print. Voice identification is known in the art. The call system 110 can access the stored voice prints from a voice print repository, which may be stored locally by the call system 110 or accessed from remote memory elements to which the call system 110 is communicatively linked.

Based on the user identifier, caller ID, telephone number and/or voice identification, the call system 110 also can retrieve any of a variety of other information associated with the users 120-124 and store such information to the e-meeting data structure 130. For example, the call system 110 can access, via one or more networks (e.g., an intranet or the Internet), one or more phonebooks 140, one or more employee directories 142, team analytics information 144, user community profiles 146 and/or other information sources 148. Examples of such other information sources include, but are not limited, social networking sites, forums, blogs, and the like. The information retrieved from the information sources 140-148 can include information related to projects on which the user is working, user interests, information related to publications created by the user, information related to the user's interests and/or family, information related posts and/or status updates by the user in social networking sites, forums, blogs or the like, or any other type of information that may be obtained from the information sources 140-148.

The call system 110 also can identify a location of each user placing an incoming call, and store corresponding location information to the e-meeting data structure 130. For example, the call system 110 can access, for example from the phonebooks 140, employee directories 142, etc., a location associated with each user and store that location to the e-meeting data structure 130. In one arrangement, the call system 110 can identify a location based on the telephone number indicated for an incoming call. For example, if the telephone number is assigned to a particular organization, the call system 110 can identify that organization and the location of the organization. The call system 110 also can identify an area code and/or prefix and, based on the area code and/or prefix, identify a geographic area to which the area code and/or prefix are assigned. Further, if an information resource, such as a phonebook 140, indicates a specific location for a particular telephone number, the call system can identify that location. In an arrangement in which the particular user is identified via the user identifier and/or telephone number, and user shares global positioning system (GPS) coordinates from the user's communication device, the user's location can be obtained from the GPS coordinates. The location of the user also can be obtained from a user status update in a social networking system.

During an e-meeting, the call system 110 can share information of users 120-124 with other users 120-124. For example, responsive to the user 120 placing a call to the user 122, the call system 110 can store the aforementioned information associated with that user to the e-meeting data structure 130, and present the information to the user 122. In another example, responsive to the user 120 calling in to a conference call, the call system 110 can store the aforementioned information associated with that user to the e-meeting data structure 130, and present the information to one or more of the users 120-124 participating in the conference call. In one arrangement, the information can be presented in a dashboard, which will be described herein.

Figure 2:
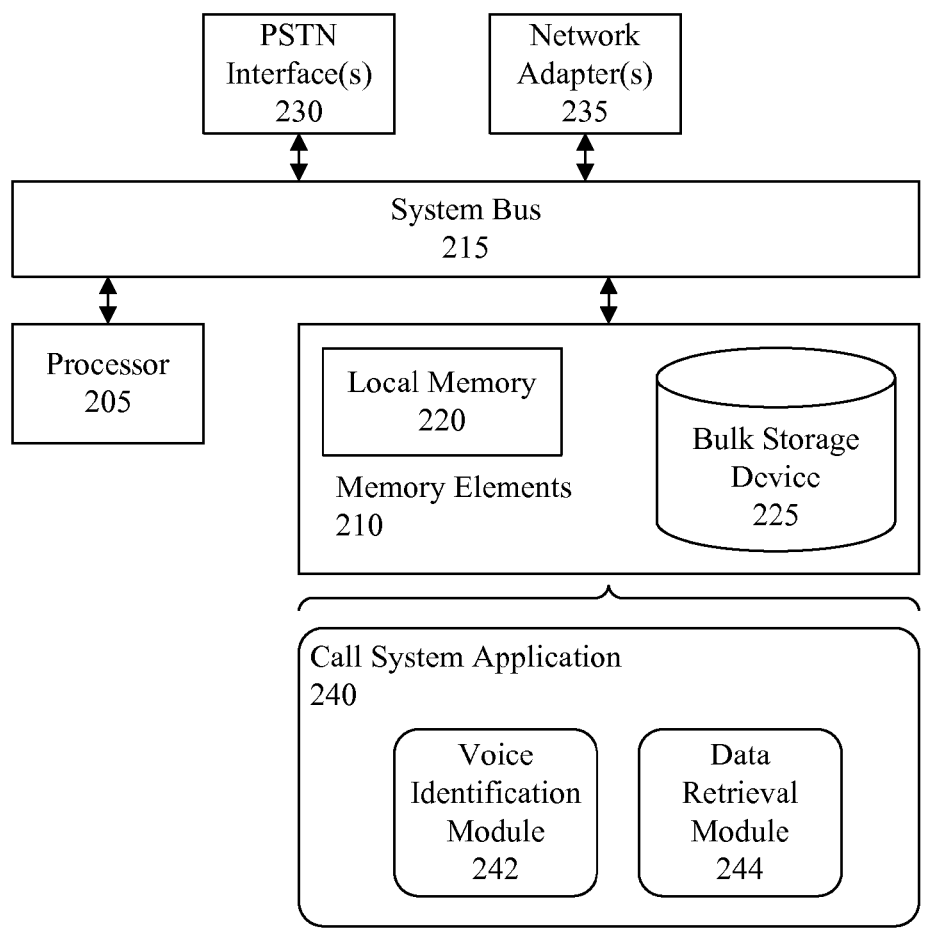
FIG. 2 is a block diagram illustrating example architecture for a call system.

FIG. 2 is a block diagram illustrating example architecture for the call system 110. The call system 110 can include at least one processor 205 coupled to memory elements 210 through a system bus 215 or other suitable circuitry. As such, the call system 110 can store program code within the memory elements 210. The processor 205 can execute the program code accessed from the memory elements 210 via the system bus 215. It should be appreciated that the call system 110 can be implemented in the form of any system including a processor and memory that is capable of performing the functions and/or operations described within this specification. For example, the call system 110 can be implemented as a computer, for example a server, or as processing system specifically configured to perform call handling operations.

The memory elements 210 can include one or more physical memory devices such as, for example, local memory 220 and one or more bulk storage devices 225. Local memory 220 refers to random access memory (RAM) or other non-persistent memory device(s) generally used during actual execution of the program code. The bulk storage device(s) 225 can be implemented as one or more hard disk drives (HDDs), one or more solid state drives (SSDs), or other persistent data storage device(s). The call system 110 also can include one or more cache memories (not shown) that provide temporary storage of at least some program code in order to reduce the number of times program code must be retrieved from the bulk storage device 225 during execution.

Input/output (I/O) devices such as one or more public switched telephone network (PSTN) interfaces 230 and one or more network adapters 235 can be coupled to the call system 110. The I/O devices can be coupled to the call system 110 either directly or through intervening I/O controllers. The PSTN interface(s) 230 can be configured to receive incoming calls via the PSTN. Via the PSTN interface(s) 230, the call system 110 can answer the incoming calls, route the calls to an appropriate user (e.g., to the user's call device), connect the incoming calls to a conference call, and the like. The network adapter(s) 235 can enable the call system 110 to receive incoming calls received over an Internet Protocol network, such as the Internet. The network adapter(s) 235 also can enable the call system 110 can answer the incoming calls, route the calls to an appropriate user (e.g., to the user's call device), connect the incoming calls to a conference call, and the like. The network adapter(s) 225 also can enable the call system 110 to become coupled to other systems, computer systems, remote printers, and/or remote storage devices through intervening private or public networks. Modems, cable modems, transceivers, and Ethernet cards are examples of different types of network adapters 235 that can be used with the call system 110.

As pictured in FIG. 2, the memory elements 210 can store the components of the call system 110, for example a call system application 240. Being implemented in the form of executable program code, the call system application 240 can be executed by the processor 205 to implement the processes and operations described herein that are performed by the call system 110. As such, the call system application 240 can be considered part of the call system 110. The call system application 240 can include, or access, various computer program modules, for example a program module 242 configured to perform voice identification and a data retrieval module 244 configured to retrieve information, for example as described herein.

Figure 3:
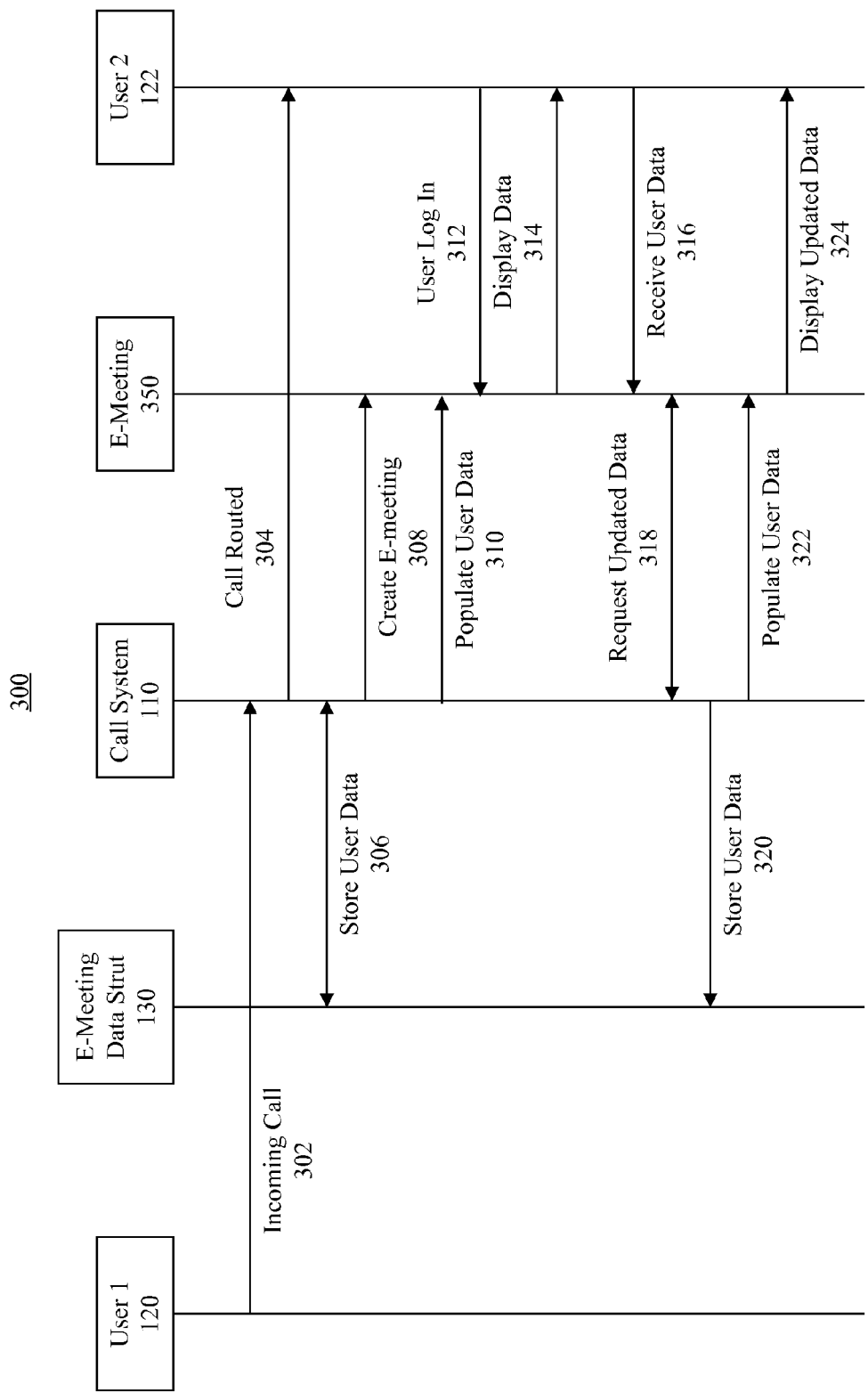
FIG. 3 is a flow diagram illustrating an example of data exchanged in a communication system during an e-meeting.

FIG. 3 is a flow diagram 300 illustrating an example of data exchanged in a communication system during an e-meeting. At step 302, the user 120 can place a call to the user 122. The call system 110 can receive the incoming call from the user 120 and, at step 304, route the call to the user 122. At step 306, the call system 110 can store user data associated with the user 120 into the e-meeting data structure 130. Such user data can include a user identifier corresponding to the user 120, the user's telephone number, the user's location information, or any of the other information obtained as previously described. As noted, the e-meeting data structure 130 can be created by the call system 110 in response to receiving the incoming call. At step 308, the call system 110 can create an e-meeting 350. The call system 110 can assign to the e-meeting 130 an e-meeting identifier corresponding to the e-meeting identifier entered into the e-meeting data structure 130 created to store the user information.

At step 310, the call system 110 can populate to the e-meeting 350 the user data of the user 120. At step 312, the user 122 can log into the e-meeting 350. In illustration, the user 122 can receive the incoming call from the user 120. Responsive to a desire to view information associated with the user 120, the user 122 can log into the e-meeting 350. At step 314, available data related to information gathered for the user 120 can be presented to the user 122, for example via a meeting dashboard.

In some cases the system 110 may not recognize the user 120, and thus may not have obtained sufficient information related to the user 120. Nonetheless, the user 122 may recognize the user's voice and/or image. Thus, at step 316, the e-meeting 350 can receive from the user 122 data indicating the identity of the user 120. At step 318, the e-meeting 350 can request from the call system 110 updated user information of the user 120, the request indicating the identity of the user 120 as specified by the user 122. At step 320, the call system 110 can store user data associated with the user 120 into the e-meeting data structure 130, for example as previously described. At step 322, the call system 110 can populate to the e-meeting 350 the user data of the user 120 obtained in response to step 316. At step 324, updated data related to information gathered for the user 120 can be presented to the user 122, for example via the meeting dashboard.

The example described with reference to FIG. 3 regards an e-meeting in which the user 120 calls the user 122. Nonetheless, this example can be expanded to include an example in which users 120-124 participate in a conference call. For example, steps 302-314 can be performed for each user calling into the conference call, and steps 316-324 can be performed at the behest of a user (e.g., a lead person or administrator) participating in or overseeing the conference call. Moreover, the data displayed at steps 314 and 324 can be displayed to all users logging into the e-meeting 350, or to a subset of such users having assigned permission to view such data.

Figure 4:
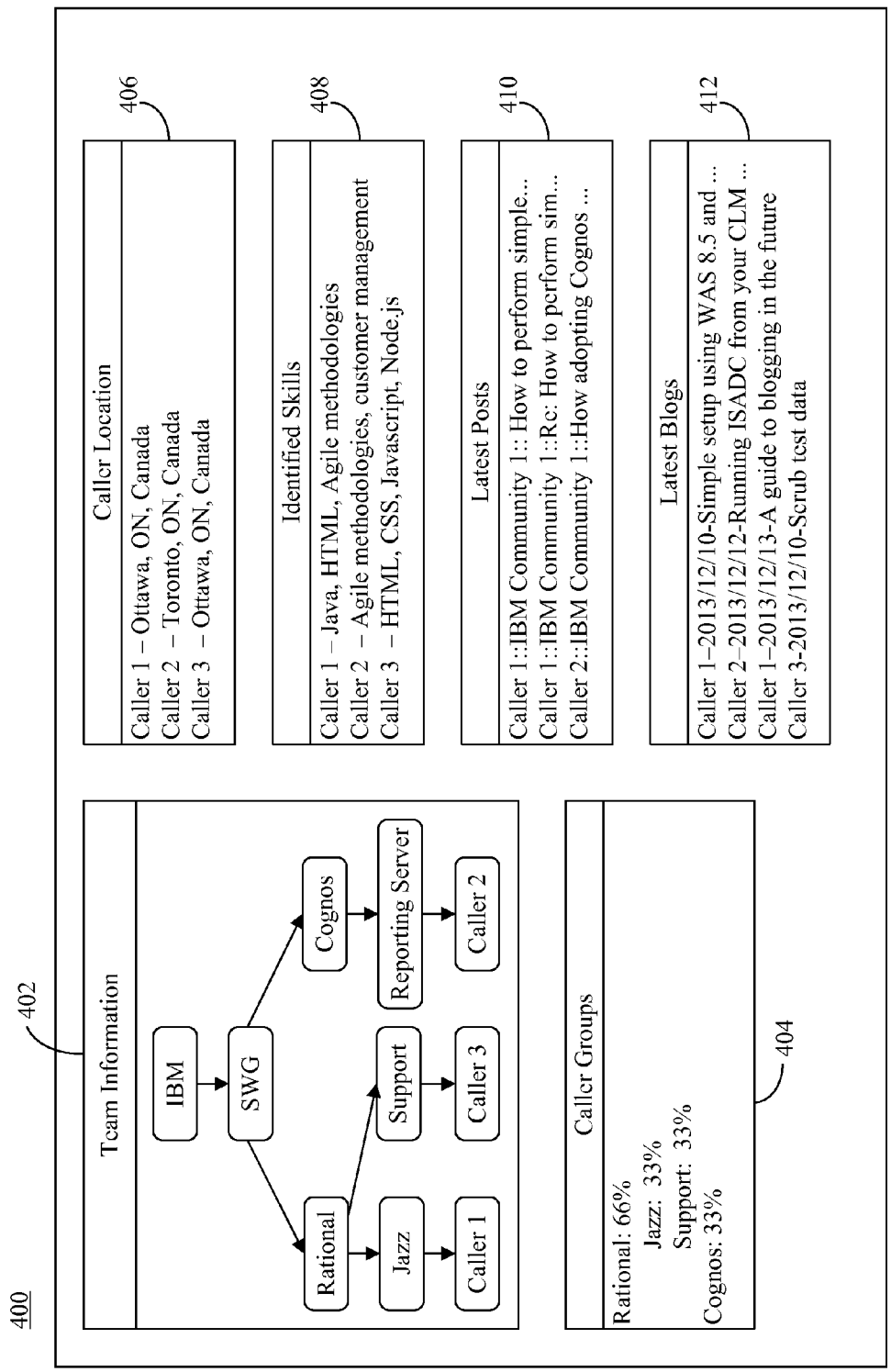
FIG. 4 depicts a view of a dashboard presented to a user during an e-meeting.

FIG. 4 depicts a view of a dashboard 400 presented to a user during an e-meeting. The dashboard 400 can present profiles of one or more users participating in an e-meeting. The dashboard 400 can include, for example, a team information field 402. The team information field can be populated with information indicating a hierarchy of teams, or groups, represented by users, indicated as callers, who are participating in an e-meeting. Information for constructing the team information field 402 can be obtained, for example, from the team analytics information 144 and information obtained from the various users 120-124 of FIG. 1.

The dashboard also can present a caller groups field 404. The call groups field 404 can indicate a portion, for example a percentage, of the users who are associated with each of a plurality of groups. In this Example, caller 1 and caller 2 each are associated with the Rational business unit and caller 2 is associated with the Cognos business unit. Thus, in the caller groups field 404, the Rational business unit can be indicated as being represented by 66% of the callers, and the Cognos business unit can be indicated as being represented by 33% of the callers. The caller groups field 404 also can indicate a portion of users who are associated with specific sub groups. In this example, caller 1 is associated with the Jazz group and caller 3 is associated with the support group. Accordingly, the Jazz group can be indicated as being represented by 33% of the callers and the support group can be indicated as being represented by 33% of the callers. Such indications can be presented under the Rational business group in the caller groups field 404 to indicate that the Jazz and support groups sub groups of the Rational business unit.

The dashboard 400 also can present a location field 406. The location field 406 can indicate, for each user (indicated as a respective caller in FIG. 4), the user's location. The user's location can be determined as previously described. The dashboard 400 also can present an identified skills field 408. The identified skill for each user can be determined by information contained in the employee directory 142, the team analytics information 144, the user community profiles 146 and/or the other information 148 described with regard to FIG. 1. The dashboard 400 also can present a latest posts field 410. The identified latest posts 408 for each user can be determined by information contained in other information 148 described with regard to FIG. 1. For instance, the latest posts can be posts made by the user in one or more social networking sites, forums, blogs, and the like, which can be obtained by the other information 148. The dashboard 400 also can present a latest blogs field 412. The identified latest blogs field 412 for each user can be determined by information contained in other information 148 described with regard to FIG. 1. The latest blogs can be, for example, blogs created and/or maintained by the user can be obtained by the other information 148.

Sometimes, a group of users may be participating in an e-meeting over a single line, for example if the users are seated together in a conference room and participating in the e-meeting using a single speaker phone. In such case, that group of users can be identified in the dashboard 400 as a single caller, though this need not be the case. For example, voice identification can be used by the call system to identify each of the users, and each user can be indicated as being an individual caller even though the users are participating in the e-meeting over a single line. Moreover, the fields 408-412 can be populated with information obtained for a plurality of the users.

Referring to FIGS. 1 and 4, in an arrangement in which the user 122 receives a call from the user 120, the dashboard 400 can be presented to the user 122. In this arrangement, the dashboard 400 can be populated with information associated with the user 120. Optionally, the dashboard also can be populated with information associated with the user 122 and presented to the user 120.

In an arrangement in which the e-meeting is a conference call, the dashboard 400 can be presented to each user 120-124 who authorized to view the dashboard 400. In illustration, each user 120-124 participating in the conference call can log in to the conference call. Each user's credentials can be processed to determine who is authorized to view the dashboard 400. The dashboard 400 can be presented to those users having credentials to view the dashboard 400. Moreover, the dashboard 400 can be updated as new users 120-124 join the conference call, as information about users 120-124 is obtained, etc.

The fields 402-412 presented in the dashboard 400 can be presented in an organized manner, facilitating easy comprehension of the information contained in the fields 402-412. Based on the presented information, one or more users 120-124 participating in the e-meeting can make decisions regarding topics being discussed in the e-meeting. For example, the user identified as caller 2 is indicated in the identified skills field 408 as having skills related to customer management. Thus, a user viewing the dashboard will know that questions regarding customer management should be directed to caller 2. Moreover, information contained in the latest posts field 410 and latest blogs field 412 can indicate interests and expertise of the callers, and thus can be considered when directing questions to users, bringing up topics for discussion, etc. Location information presented in the call location field 406 can make users aware of the respective locations of the callers participating in the e-meeting. Knowledge of the respective caller locations can be beneficial, for example, when location specific information is being discussed, when selecting times for future e-meetings, etc.

Figure 5:
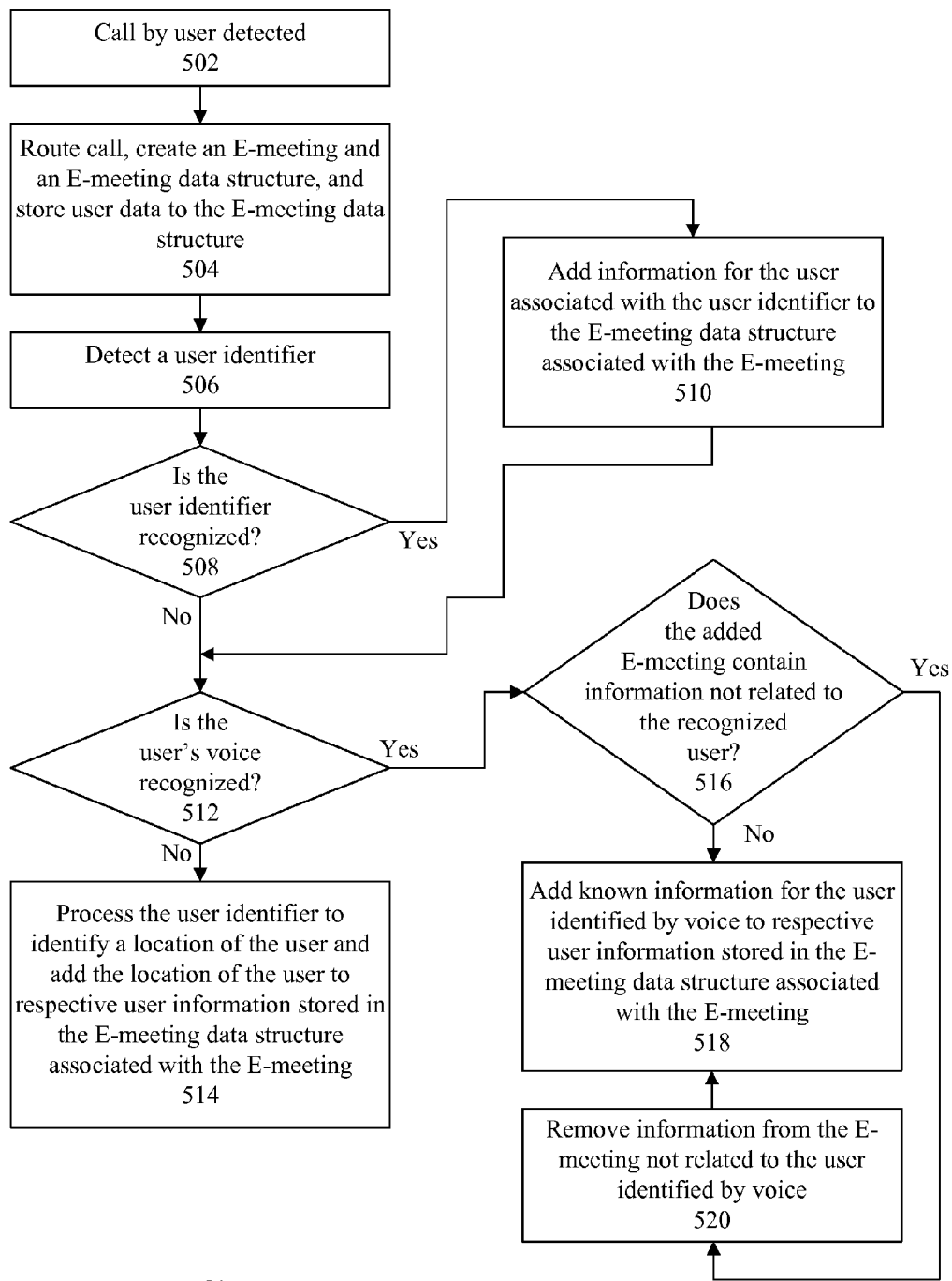
FIG. 5 is a flow chart illustrating an example of a method of identifying information of a user during a call.

FIG. 5 is a flow chart illustrating an example of a method 500 of identifying information of a user during a call. The method can be implemented for one or more user participating in an e-meeting. In one arrangement, the method can be implemented for each user participating in an e-meeting.

At step 502, a call by a user can be detected by the call system. At step 504, the call can be routed, by the call system, either to the called user or to a conference call. Further, the call system can create an e-meeting for the call. Further, the call system also can create an e-meeting data structure for the call. Data associated with the user can be stored by the call system to the e-meeting data structure. For example, a user identifier (e.g., a telephone number or other identifier) associated with the user can be added to respective user information stored in the e-meeting data structure and associated with the e-meeting.

At step 506, the call system can detect a user identifier associated with the user. The user identifier can be, for example, a telephone number, a name, a nickname, or the like. In the case that multiple users are participating in the e-meeting over a single line, the user identifier can indicate that group of users, for example based on a business unit, or group of a business unit, with which the users are associated.

Referring to decision box 508, the call system can determine whether a user identifier is recognized. For example, the call system can search a data structure containing a list of known user identifiers and determine whether the user identifier is contained in the list. If so, at step 510, based on the user identifier, the call system can retrieve information associated with the user and add the user information to the e-meeting data structure associated with the e-meeting. Proceeding to decision box 512, the call system can determine whether the user's voice is recognized using voice identification. If not, the process can proceed to step 514. At step 514, the call system can process the user identifier to identify a location of the user, for example as previously described. Further, the call system can add the location of the user to respective user information stored in the e-meeting data structure associated with the e-meeting.

If at decision box 512 the user's voice is recognized, the process can proceed to decision box 516. At decision box 516, the call system can determine whether the information, added to the e-meeting data structure at step 510, contains information not related to the user identified by the user's voice. For instance, in the case that multiple users are participating in the e-meeting over a single line, information for the multiple users may have been obtained. In another example, a user may be participating in the e-meeting using another user's communication device. Hence, information for the user normally associated with that device may have been added to the e-meeting, although that particular user may not be participating in the e-meeting.

If the call system determines that the information added to the e-meeting added at step 510 does not contain information not related to the user identified by the user's voice, at step 518 the call system can add known information for the user associated with the user identifier to respective user information. Such user information can be stored in the e-meeting data structure associated with the e-meeting. Further, the user identifier can be linked to the user for future calls.

If at decision box 516 the call system determines that the information added to the e-meeting added at step 510 contains information not related to the user identified by the user's voice, the process can proceed to step 520. At step 520, information not related to the user, identified by the user's voice, can be removed from the e-meeting by the call system. Accordingly, only information associated with the identified user need be retained. The process then can proceed to step 518, in which known information for the user associated with the user identifier can be added to respective user information stored in the e-meeting data structure associated with the e-meeting. Again, the user identifier can be linked to the user for future calls.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," or similar language means that a particular feature, structure, or characteristic described in connection with the embodiment is included in at least one embodiment described within this disclosure. Thus, appearances of the phrases "in one embodiment," "in an embodiment," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
a processor programmed to initiate executable operations comprising:
responsive to detecting a call from a first user into a call system, adding a user identifier associated with the first user to respective user information stored in an e-meeting data structure associated with the call;
determining whether the call system recognizes the user identifier associated with the first user;
responsive to determining the call system does not recognize the user identifier associated with the first user, determining whether the call system recognizes a voice of the first user;
responsive to determining the call system does not recognize the voice of the first user, identifying, based on the user identifier associated with the first user, a location of the first user and adding the location of the first user to respective user information stored in the e-meeting data structure associated with the call; and
generating an e-meeting for the call, the e-meeting including as participants the first user and at least a second user.

2. The system of claim 1, the executable operations further comprising:
determining whether the call system recognizes a voice of a third user; and
responsive to determining the call system does recognize the voice of the third user, adding information associated with the third user to the e-meeting data structure.

3. The system of claim 2, the executable operations further comprising:
responsive to determining the call system does recognize the voice of the third user, determining whether the e-meeting contains information for the third user that is not related to the recognized third user; and
responsive to determining that the e-meeting for the third user contains information for the third user that is not related to the recognized third user, removing from the e-meeting the information for the third user that is not related to the recognized third user;
wherein adding information associated with the third user to the e-meeting data structure comprises adding information for the third user that does not include the removed information.

4. The system of claim 1, the executable operations further comprising:
presenting to at least the second user a view of a dashboard, the dashboard presenting a profile of at least the first user, the profile comprising at least the location of the first user and at least one type of information selected from a group consisting of identified skills of the first user, a latest post made by the first user to a social network site, forum or blog, and a latest blog created or maintained by the first user.

5. The system of claim 4, wherein the dashboard further presents a hierarchy of teams or groups represented by a plurality of users participating in the e-meeting.

6. The system of claim 4, wherein the dashboard further indicates a portion of users participating in the e-meeting who are associated with each of a plurality of groups.

7. The system of claim 6, wherein the dashboard further indicates a portion of users participating in the e-meeting who are associated with each of a plurality of sub groups.

8. A computer program product comprising a computer readable storage medium having program code stored thereon, the program code executable by a processor to perform a method comprising:
   responsive to detecting a call from a first user into a call system, adding, by the processor, a user identifier associated with the first user to respective user information stored in an e-meeting data structure associated with the call;
   determining, by the processor, whether the call system recognizes the user identifier associated with the first user;
   responsive to determining the call system does not recognize the user identifier associated with the first user, determining, by the processor, whether the call system recognizes a voice of the first user;
   responsive to determining the call system does not recognize the voice of the first user, identifying, by the processor processing the user identifier associated with the first user, a location of the first user and adding the location of the first user to respective user information stored in the e-meeting data structure associated with the call; and
   generating, by the processor, an e-meeting for the call, the e-meeting including as participants the first user and at least a second user.

9. The computer program product of claim 8, the method further comprising:
   determining, by the processor, whether the call system recognizes a voice of a third user; and
   responsive to determining the call system does recognize the voice of the third user, adding, by the processor, information associated with the third user to the e-meeting data structure.

10. The computer program product of claim 9, the method further comprising:
    responsive to determining the call system does recognize the voice of the third user, determining, by the processor, whether the e-meeting contains information for the third user that is not related to the recognized third user; and
    responsive to determining that the e-meeting for the third user contains information for the third user that is not related to the recognized third user, removing, by the processor, from the e-meeting the information for the third user that is not related to the recognized third user;
    wherein adding information associated with the third user to the e-meeting data structure comprises adding information for the third user that does not include the removed information.

11. The computer program product of claim 8, the method further comprising:
    presenting, by the processor, to at least the second user a view of a dashboard, the dashboard presenting a profile of at least the first user, the profile comprising at least the location of the first user and at least one type of information selected from a group consisting of identified skills of the first user, a latest post made by the first user to a social network site, forum or blog, and a latest blog created or maintained by the first user.

12. The computer program product of claim 11, wherein the dashboard further presents a hierarchy of teams or groups represented by a plurality of users participating in the e-meeting.

13. The computer program product of claim 11, wherein the dashboard further indicates a portion of users participating in the e-meeting who are associated with each of a plurality of groups.

14. The computer program product of claim 13, wherein the dashboard further indicates a portion of users participating in the e-meeting who are associated with each of a plurality of sub groups.

* * * * *